Patented July 21, 1942

2,290,279

UNITED STATES PATENT OFFICE 2,290,279

ZINC SULPHIDE PIGMENT

Clayton W. Farber, Bowmanstown, Pa., assignor to The New Jersey Zinc Company, New York, N. Y., a corporation of New Jersey No Drawing. Application October 30, 1941, Serial No. 417,113

11 Claims. (Cl. 23—135)

This invention relates to the manufacture of pigment zinc sulphide from zinc sulphide precipitate and is concerned particularly with the end-pointing treatment of such precipitate. More particularly, the invention is concerned with the end-pointing of zinc sulphide obtained by precipitation with hydrogen sulphide.

Zinc sulphide may be precipitated from zinc sulphate solution by reaction with barium sulphide in the well-known lithopone reaction. In such case a co-precipitate of barium sulphate and zinc sulphide is formed. Zinc sulphide may also be precipitated separately from a zinc salt solution with hydrogen sulphide and this may be a batch operation (such for example, as that disclosed in United States Patent No. 2,130,382) or a continuous operation (as described in United States Patent No. 2,020,918). Whether the zinc sulphide formed by precipitation with H₂S is made in a batch or in a continuous operation, the crude precipitate, prior to an end-pointing treatment with a neutralizing agent and other finishing operations adapted to make it suitable as a pigment, is first aged for a variable period, say, three hours, in its mother liquor and thereafter filtered, washed and repulped in water to form a slurry in which the end-pointing treatment is conducted.

Heretofore, barium hydroxide has been preferred as a neutralizing reagent for the end-pointing treatment especially when the zinc sulphide is produced by a continuous process; see for example United States Patent No. 2,020,918, although calcium hydroxide has been substituted as an end-pointing reagent in some instances, care being taken to avoid deleterious effects on the product brought about by impurities (for example, iron) present in the calcium hydroxide.

As the result of my investigations, I have discovered that improved results, particularly from the standpoint of light resistance of the finished product can be obtained by end-pointing zinc sulphide precipitate (particularly zinc sulphide obtained by precipitation with hydrogen sulphide) with borax in addition to neutralizing agents. Preferably the end-pointing is conducted with a zinc sulphide precipitate substantially free from barium sulphate or other substance capable of adsorbing borax.

In accordance with my invention, a crude zinc sulphide precipitate, preferably in aqueous suspension and derived through the use of hydrogen sulphide as a precipitant, is treated with borax in proportions ranging from .1% to 1% on the weight of the zinc sulphide, in addition to neutralizing agents. By neutralizing agents I mean alkaline reagents such as metallic oxides, hydroxides, carbonates etc. that are capable of neutralizing acid present in the precipitate.

For optimum results the borax should be employed with lime, and preferably also with a soluble alkali, as neutralizing agents. Thus, a slurry of the zinc sulphide precipitate may be treated with a mixture of borax, calcium hydroxide (milk of lime) and a soluble alkali such as sodium or potassium hydroxide or sodium or potassium carbonate.

I have discovered that the choice of reagents to be employed with the borax depends upon the manner in which the zinc sulphide precipitate is formed. Thus, I have found that zinc sulphide formed in a batch process (for example by the method of United States Patent No. 2,130,382) should be treated with borax together with calcium hydroxide and alkali metal carbonate. On the other hand, zinc sulphide produced by a continuous method (for example that of United States Patent No. 2,020,918) should be treated with borax accompanied by calcium hydroxide and alkali metal hydroxide. In both instances, the presence of lime brings about a substantial improvement in the optical properties of the product obtained after conventional steps of muffling and quenching, since the presence of lime renders the product less sensitive to variations in muffling conditions. However, lime having a clear white color by reason of a sufficient freedom from impurities such as iron must be used.

To consider the invention in greater detail, the zinc sulphide precipitate, irrespective of the method of derivation, should be aged in the customary fashion in its mother liquor and thereafter washed and re-pulped as an aqueous slurry. To this slurry, the borax, accompanied by at least one neutralizing reagent is added. Thus, to an aqueous slurry of zinc sulphide obtained in a batch process as described in United States Patent No. 2,130,382 there is added 0.3% borax, 1.9 to 2.2% sodium carbonate and 0.2 to .25% calcium hydroxide, all proportions being based upon the weight of zinc sulphide. The use of the alkali metal carbonate with borax in the end-pointing of a zinc sulphide slurry obtained by a batch method is particularly desirable because it brings about a great improvement in the filtering properties of this slurry.

When the zinc sulphide is produced by a continuous process, for example that of United States Patent No. 2,020,918, it should be treated with borax accompanied by sodium hydroxide and calcium hydroxide. Thus, to a repulped aqueous slurry of such a precipitate there may be added 0.3% borax, .3 to .5% sodium hydroxide and .2 to .5% calcium hydroxide, all percentages being based upon the weight of the zinc sulphide.

As indicated above, the proportion of borax employed may range from .1% to 1% on the weight of the zinc sulphide. However, it is desirable to stay within a range of about .3% to about .6%. If more than about .6% borax is added to the slurry, the temperature of the subsequent conventional muffling treatment of the zinc sulphide is extremely critical. A slight increase or decrease from the optimum muffling temperature will lead to a pronounced loss of hiding power in the finished treatment if more than .6% borax is employed. Consequently, it is difficult to secure a product with uniform optical properties (hiding power and tinting strength) when employing more than .6% borax. Moreover, borax additions in excess of .3% do not bring about much additional improvement in light resistance. In other words, the law of diminishing returns applies when the borax employed exceeds about .3% and when it exceeds about .6% very careful muffling control is necessary.

My invention is not applicable to the treatment of lithopone, i. e. to a co-precipitate of zinc sulphide and barium sulphate. Thus, I have discovered that no substantial improvement in light resistance is obtained if crude lithopone is end-pointed with borax. This is believed to be due to the fact that borax has a substantially different fluxing effect upon barium sulphate than upon zinc sulphide. When lithopone is end-pointed with borax, it is probable that the latter is adsorbed preferentially by the barium sulphate and thus has little or no effect upon the zinc sulphide. In consequence, my invention contemplates the end-pointing of zinc sulphide in the absence of other precipitates capable of adsorbing borax, and more particularly contemplates the treatment of zinc sulphide that is substantially free of barium sulphate.

The zinc sulphide pigment prepared in accordance with my invention is substantially purer than zinc sulphide which is end-pointed with barium hydroxide as described in United States Patent No. 2,020,918, for end-pointing with the latter reagent results in the introduction of substantial amounts of barium sulphate into the product. Thus, zinc sulphide end-pointed with barium hydroxide will contain, on the average, about 93.2% ZnS. Zinc sulphide end-pointed with borax, calcium hydroxide and a soluble alkali, say, sodium carbonate or sodium hydroxide may contain as much as 99.1% ZnS, and if it is washed by centrifuging it will have a very low content of water-soluble salts, i. e. less than .24%.

Zinc sulphide end-pointed in accordance with my invention has superior light resistance. This superiority is evident when the product is exposed outdoors to sunlight in vehicles that normally show considerable darkening with zinc sulphide, for example, the vehicles customarily employed in the manufacture of traffic and stucco paints. When zinc sulphide end-pointed in accordance with my invention is tested under water with a source of ultraviolet light, such as the usual mercury vapor lamp, relatively low in visible and short infra-red radiation, the superiority in light resistance may not be apparent. This circumstance may be explained as follows:

The degree of light darkening obtained with a zinc sulphide pigment under practical exposure conditions is determined primarily by the relative rates of two photochemical reactions. The first is the photochemical decomposition of the zinc sulphide brought about by ultraviolet light and resulting in the formation of dark-colored metallic zinc. The effect of this decomposition reaction is compensated for in part by the second photochemical reaction which is also brought about by ultraviolet radiations and which involves the oxidation of the metallic zinc to white zinc oxide. In laboratory tests where the pigment is submerged under water and exposed to ultraviolet light the second photochemical reaction, i. e. the bleaching reaction, is held to a minimum.

In addition to the primary photochemical reactions described above, there is a third photochemical effect. This is the inhibiting action of visible light or infra-red radiations or both on the ultraviolet decomposition reaction of zinc sulphide. In actual outdoor exposures when no filters are employed, the pigment is exposed to visible light and also to infra-red and ultraviolet radiations. It is believed that in such case, the borax brings about an improvement in light resistance by increasing the response of the pigment to the inhibiting action of the visible and infra-red radiations and also by increasing the rate of reoxidation of metallic zinc to zinc oxide under the influence of the ultraviolet portion of the spectrum.

The following comparative exposure tests give a numerical indication of the degree of improvement in light resistance which may be obtained through the use of borax in the end-pointing of zinc sulphide in accordance with my invention. In the tests, zinc sulphide end-pointed in accordance with the regular procedure for this particular material was compared with the same zinc sulphide prepared in exactly the same way except that it was end-pointed with borax.

Thus, one of the pigments was zinc sulphide made in accordance with United States Patent No. 2,130,382 and end-pointed with 1.6% zinc oxide, 2.1% sodium carbonate and 0.2% calcium hydroxide. In the other case, the same zinc sulphide was end-pointed with 1.6% zinc oxide, .3% borax, about 1.9% sodium carbonate, and about .25% calcium hydroxide. In both cases, cobalt sulphate containing cobalt equivalent to .008% of the zinc present in the zinc sulphide precipitate was added along with the other reagents. After end-pointing, both pigments were subjected to identical finishing treatments of conventional type, including muffling. In both instances, the pigments were incorporated in a typical traffic paint vehicle having the following composition:

Amberol F-7 (modified phenol formaldehyde
 type resin) _____pounds__ 100
China-wool oil _____gallons__ 12
Medium bodied linseed oil having a viscosity
 of Q_____gallons__ 5
Lead and cobalt driers to give the desired drying
 characteristics and thinned to contain 60 per
 cent mineral spirits.

This vehicle is of a type which normally tends to increase the light darkening tendency of commercial zinc sulphide pigments.

In both instances, the paints made with the foregoing vehicle included 65% by weight of pigment which consisted of the zinc sulphide pigment without other pigments or extenders. The paints were applied to glass panels and after drying the initial brightness of the film in each case was determined with a photoelectric reflectometer. The painted panels were then exposed on a roof in latitude about 40° 42′ north for three hours on a July day when the sky was somewhat overcast, which is a condition particularly favorable to light darkening of zinc sulphide pigments.

After the initial brightness of each paint film was determined and the exposure made, the films were re-examined immediately, brightness being again determined with the photoelectric reflectometer. The results of the tests before and after exposure are given below:

| Pigment | Initial brightness relative to MgO=98 | Brightness after exposure | Decrease in brightness during exposure |
| --- | --- | --- | --- |
| Regular endpoint | 91.2 | 84.0 | 7.2 |
| Borax endpoint | 89.8 | 88.2 | 1.6 |

The practice of the present invention may be combined advantageously with the process described in United States Patent No. 2,105,834, according to which zinc oxide is added during the end-pointing of zinc sulphide pigments in order to decrease the acidity of the finished pigment. The zinc oxide thus added combines with sulphur ions during calcination of the pigment. Thus, I have found that it is desirable to add a small amount of zinc oxide (say, 1½% on the weight of the zinc sulphide) to the repulped slurry during end-pointing with borax.

The end-pointing method of my invention may also be employed advantageously in conjunction with the method described and claimed in United States Patent No. 1,693,902 which involves improving the light fastness of pigments containing zinc sulphide by treatment with cobalt. Thus, a water-soluble cobalt compound containing cobalt equivalent to 0.008% of the zinc present in the ZnS precipitate may be added along with the borax and other reagents. The use of both borax and a cobalt compound brings about a greater improvement in light resistance than does the use of either of these agents alone.

I claim:

1. In the manufacture of zinc sulphide pigment from a zinc sulphide precipitate, the improvement which comprises end-pointing the precipitate by incorporating borax therein in addition to neutralizing agents, the proportion of borax present being from about .1% to about 1% on the weight of the zinc sulphide.

2. In the manufacture of zinc sulphide pigment from a zinc sulphide precipitate formed with hydrogen sulphide, the improvement which comprises end-pointing the zinc sulphide precipitate with a neutralizing agent plus borax in proportions ranging from about .1% to about 1% on the weight of the zinc sulphide.

3. In the manufacture of zinc sulphide pigment from a zinc sulphide precipitate, the improvement which comprises treating the precipitate with borax and neutralizing agents, the proportion of borax present being from about .3% to about .6% on the weight of the zinc sulphide.

4. In the manufacture of zinc sulphide pigment from a zinc sulphide precipitate formed with hydrogen sulphide in a batch operation, the improvement which comprises end-pointing the precipitate with borax, lime and an alkali metal carbonate, the proportion of borax present being from about .1% to about 1% on the weight of the zinc sulphide.

5. In the manufacture of zinc sulphide pigment from a zinc sulphide precipitate formed with hydrogen sulphide in a continuous operation, the improvement which comprises end-pointing the precipitate with borax, lime and an alkali metal hydroxide, the borax being employed in proportions ranging from about .1% to about 1% on the weight of the zinc sulphide.

6. In the manufacture of zinc sulphide pigment from a zinc sulphide precipitate formed with hydrogen sulphide, the improvement which comprises end-pointing the precipitate with borax and zinc oxide, the proportion of borax present being from about .1% to about 1% on the weight of the zinc sulphide.

7. In the end-pointing of pigment zinc sulphide involving the addition of an alkaline reagent to a zinc sulphide precipitate, the improvement which comprises end-pointing the zinc sulphide precipitate with about 0.3 percent borax on the weight of the zinc sulphide in addition to the alkaline reagent.

8. In the end-pointing of pigment zinc sulphide, the improvement which comprises incorporating into an aqueous slurry of substantially pure zinc sulphide precipitate borax in proportions ranging from about .1% to about 1% on the weight of the zinc sulphide, the borax being added with a neutralizing agent.

9. In the end-pointing of pigment zinc sulphide, the improvement which comprises treating the zinc sulphide precipitate substantially free from barium sulphate with borax, the proportion of borax present being from about .1% to about 1% on the weight of the zinc sulphide, the borax being added with a neutralizing agent.

10. In the finishing of pigment zinc sulphide formed with hydrogen sulphide in a batch operation, the improvement which comprises incorporating into an aqueous slurry of the precipitate borax in proportions ranging from about .1% to about 1% on the weight of the zinc sulphide, lime and sodium carbonate.

11. In the manufacture of pigment zinc sulphide formed with hydrogen sulphide in a continuous operation, the improvement which comprises treating the zinc sulphide precipitate with borax, lime and sodium hydroxide, the proportion of borax present being from about .1% to about 1% on the weight of the zinc sulphide.

CLAYTON W. FARBER.